2,927,936

PROCESS FOR THE PREPARATION OF HEAVY METAL SALTS OF SUBSTITUTED DITHIOCARBAMIC ACIDS

Allan Morgan Harvey, Norwalk, Conn., assignor to R. T. Vanderbilt Company, Inc., New York, N.Y., a corporation of New York No Drawing. Application September 3, 1957
Serial No. 681,474

6 Claims. (Cl. 260—429)

This invention is concerned with a novel process for the preparation of heavy metal salts of substituted dithiocarbamic acids. More particularly it is concerned with a novel method for the preparation of the manganous and ferric salts of dimethyldithiocarbamic acid, and the manganous salt of ethylenebisdithiocarbamic acid.

These compounds are used commercially as fungicides. They have been prepared in the past by reactions culminating in precipitation from aqueous solution, a procedure having several disadvantages. The compounds, when prepared by precipitation from aqueous solutions, are quite unstable, and tend, especially upon storage at elevated temperatures, to decompose. The precipitation method involves the use of a considerable amount of equipment including stirrers, filters and driers. Furthermore, the products obtained by the precipitation method tend to form into cakes, while for commercial use free flowing, water-dispersible powders are desired. These and other difficulties are overcome by the method of the present invention.

It has been discovered that it is possible to prepare these heavy metal salts of the substituted dithiocarbamic acids by reacting a water soluble salt of the heavy metal with an alkali metal salt of the substituted dithiocarbamic acid, in the substantial absence of atmospheric oxygen, and with the reaction mixture containing water in an amount from about 4% to about 22% by weight. The products of the present invention are obtained in the form of free flowing, water-dispersible materials with low tendency to form cakes, and in addition they have greater stability than the products formed by the prior art. This increase in stability is manifested not only while the product remains in the reaction container, but also even after the container is opened. The process of this invention makes it possible to obtain the product while avoiding the use of stirrers, filters and driers.

Various water soluble manganous or ferric salts are employed as reactants. These include, for example, sulfates, chlorides, acetates, nitrates and the like, the particular anion being chosen so that it forms a water soluble salt with the heavy metal cation to be used. It has been found preferable to use a salt which is in the hydrated form, e.g. containing water of crystallization within the molecule. It is not necessary that the salts be chemically pure. In fact, a preferred reactant is Tecmangam, a commercial product consisting of from 75 to 78% manganese sulfate and from 11.7 to 12.5% ammonium sulfate with the remainder water of hydration. Tecmangam is the trademark of Tennessee Eastman Co.

Neither is it necessary that the alkali metal salt of the substituted dithiocarbamic acid be chemically pure. A very suitable reactant is dry Vancide 51 (trademark of R. T. Vanderbilt Co.) a product consisting of 92% dihydrate of sodium dimethyldithiocarbamate, and 8% sodium salt of 2-mercaptobenzothiazole. The presence of water of hydration in the alkali metal salt of the substituted dithiocarbamic acids is also helpful.

In carrying out the process of this invention, the water content of the reaction mixture is between about 4% and about 22% by weight. When reference is made to the water content, it is intended to include water of hydration in particular. The term includes any water adsorbed on the surface of the materials, and also water which may be added to the reaction. When the amount of water is less than about 4%, to complete the reaction in reasonable time, high temperatures must be employed, and the products tend to form cakes at such temperatures. On the other hand, when the amount of water is greater than about 22%, the product will not be a free flowing powder. The stability of the product is also increased in cases where the water content of the reaction mixture is less than about 22%. The preferred water content is generally about 15%. This percent water allows the reaction to proceed at fairly low temperatures in a reasonable length of time and with a resulting stable, free flowing product.

The reaction should be carried out in the substantial absence of atmospheric oxygen, i.e. uncombined elementary or molecular oxygen. Such oxygen may be excluded by any of several procedures. It has been found most advantageous to conduct the reaction in a closed container filled with the reactants. Alternatively, however, the reaction can be successfully accomplished in the presence of an inert gas, for example nitrogen. For optimum results care should be taken that all atmospheric oxygen be excluded, e.g. when a closed container is used, it should be completely filled with the reaction mixture so that no trapped air remains. Tightly closed glass containers, for example glass bottles with polyethylene liner caps, are advantageously used. A preferred container is an inert plastic bag, for example a polyethylene bag. Alternatively other inert closed containers, e.g. an ordinary "tin can" may be used.

The process of this invention may thus be carried out to provide the desired reaction product already packaged and ready for shipment in a single step. The ordinary packaging steps are thereby avoided. Stability is improved by maintaining the product sealed within the original reaction container. There are also obtained the additional advantages of great ease of handling and avoidance of the necessity of weighing the product at the time of its use. The reaction containers, since they can be made to contain any desired weight of product, may simply be counted to obtain the weight to be used. There is thus provided a novel and highly advantageous article of manufacture, comprising a chemically inert closed container which is substantially free from atmospheric oxygen and which contains manganous dimethyldithiocarbamate which has been prepared within said closed container by a reaction in which the water content of the reaction mixture was between about 4% and about 22% by weight.

The time required for the reaction to take place is influenced by several factors, chiefly the particular reactants being used, the water content, the ratio of reactants, the particle size of the reactants, and the temperature. It is possible to carry out the process at temperatures below room temperature, but the greater length of time required and the need for cooling make it commercially unattractive. Sometimes it is desirable to add a small amount of water, which accelerates the reaction, especially at lower temperatures. This amount of water is a relatively minor one and in no case is the added water sufficient to raise the total water content above about 22%. The reaction takes place faster at higher temperatures, but the temperature should not be so high as to cause substantial decomposition of the product. When the reaction is carried out in polyethylene bags the temperature should be kept below about 90° C. in order to prevent melting of the bag. In containers not sensitive to heat, reaction temperatures as high as about 120° C. may be employed, although it is preferred to keep the temperature below about 110° C., since the reaction at this temperature is conveniently fast, and the small gain in time saved by use of higher temperatures is economically overbalanced by the loss due to decomposition and the requirement for extra fuel. In general, the lower reaction temperatures of about 55°–65° C., with consequent longer heating periods, provide a more free flowing product than the higher temperatures. The smaller the particles of the reactants and the more intimate the mixing, the faster the reaction. It is preferred, in order that the reaction time be shortened, and also in order that the stability of the product be increased, that an excess of about 5 to 10% over the stoichiometric amount of the heavy metal salt be employed. Very surprisingly, the use of an excess of the alkali metal salt of the substituted dithiocarbamic acid has an adverse effect.

In order to obtain a product having outstandingly good free flowing and water-dispersible properties with low caking tendency, the addition of about 10% by weight of soft, highly absorptive, white, finely divided, precipitated, hydrated calcium silicate to the reaction mixture is advantageously employed. The addition of such calcium silicate increases somewhat the length of heating time before reaction at any given temperature or moisture content will occur. A typical analysis of the calcium silicate is: calcium oxide 19%, silicon dioxide 67%, loss on ignition 14%. Talc may also be used for this purpose.

In addition to the desired heavy metal salt of the substituted dithiocarbamic acid, the process of this invention also results in the formation of a byproduct salt such as sodium sulfate, sodium nitrate, potassium chloride, potassium acetate, or the like. The presence of this by-product is of no consequence, and it need not be separated from the reaction mixture, which may be used as is.

The following examples are given solely for the purpose of illustration and are not to be deemed limitations of this invention, many variations of which are possible without departing from the spirit or scope thereof.

*Example 1*

Stoichiometric amounts of manganous sulfate monohydrate and dry Vancide 51 were blended intimately by tumbling, and transferred immediately to a glass bottle sealed with a polyethylene cap. The container was filled to the top and the cap was tightly sealed. The mixture was heated at 85° C. The reaction was complete in approximately one hour. The reaction started at one point in the mixture, as evidenced in a change of color from white to green, and gradually spread until the whole mixture had turned green. Immediately prior to color change from white to green, a slightly purple color was evident throughout the mixture. At the end of an hour, the desired manganese dimethyldithiocarbamate was obtained as a dry amorphous powder. Its fungicidal activity was the same as that of material prepared in the conventional manner, but it had additional advantages in that the material in the unopened reaction container was capable of storage for long periods of time at elevated temperature without substantial decomposition. It also had the additional advantage of being free flowing and readily dispersible in water. Furthermore, when the container was opened and the manganese dithiocarbamate exposed to air, it was more stable than samples of this material prepared by conventional procedures and exposed to air for the same time at the same temperature. The conventional manganese dithiocarbamate is crystalline, but the product of this example was amorphous.

*Example 2*

A polyethylene bag was filled with 201 grams Tecmangam and 333 grams of dry Vancide 51. The container was then tightly sealed. The total moisture content of the mixture was 14.5% by weight, and the quantities used represented an excess of 8.7% manganous sulfate. After three hours of heating at 65° C., the reaction was completed. The resultant manganous dimethyldithiocarbamate was present in a free flowing, water-dispersible powder.

*Example 3*

201 grams Tecmangam and 333 grams dry Vancide 51 were charged into a glass bottle. After 54.5 grams of water had been added to the mixture, the filled bottle was tightly stoppered. The total water content of the mixture was 22.6% by weight. Reaction was finished in one hour at 65° C. The product had some tendency to form cakes, but it could still be called free flowing.

*Example 4*

24 grams of Tecmangam and 42.5 grams of dry Vancide 51 were heated for 16 hours at 55° C. in a tightly stoppered, filled glass container. The total moisture content of the reaction mixture was 15% by weight, and manganous sulfate was present in an excess of 1.27% by weight. The resultant product was free flowing.

*Example 5*

10.0 grams Tecmangam, 16.5 grams dry Vancide 51 and 1.4 grams hydrated calcium silicate were sealed in a filled, tightly stoppered glass container. The total moisture content of the mixture was 14.0% by weight, and the manganous sulfate was present in a 15.5% excess. Reaction was complete after two hours at 85° C., and the product was a free flowing powder.

*Example 6*

10.0 grams Tecmangam, 15.6 grams dry Vancide 51, and 13.8 grams of talc were heated in a filled, tightly stoppered, glass container for three hours at 85° C. In this reaction mixture the water content was 9.6%, and the manganous sulfate was present in 15.3% excess by weight. The resultant product was free flowing.

*Example 7*

8.1 grams of anhydrous ferric chloride and 25.0 grams dry Vancide 51 were heated for two hours at 60° C. in a tightly sealed, filled, polyethylene container. The total moisture content of the mixture was 13.9% and the ferric chloride was present in an excess of 8.5% by weight. The resultant ferric dimethyldithiocarbamate containing material was a free flowing powder.

*Example 8*

Stoichiometric amounts of hydrated manganous sulfate and disodium ethylenebisdithiocarbamate were placed in a tightly sealed, filled, glass container. The total moisture content of the mixture was equal to 22%. Manganous ethylenebisdithiocarbamate was formed in a free flowing powder, after heating for 6 hours at 60° C.

*Example 9*

In reactions similar to those above, potassium salts of ethylenebisdithiocarbamic acid and dimethyldithiocarbamic acid were substituted for the corresponding sodium salts. Similar results were obtained.

I claim:

1. A process for preparing a heavy metal salt of a substituted dithiocarbamic acid, said salt being selected from the group consisting of manganous dimethyldithiocarbamate, ferric dimethyldithiocarbamate, and manganous ethylenebisdithiocarbamate, said process comprising reacting a pulverulent water soluble salt of the heavy metal with a pulverulent alkali metal salt of the substituted dithiocarbamic acid, while excluding atmospheric oxygen, the reaction mixture containing water in an amount from about 4% to about 22% by weight, the reaction taking place at a temperature below about 110° C.

2. A process for the preparation of manganous dimethyldithiocarbamate, said process comprising reacting a water soluble manganous salt with an alkali metal salt of dimethyldithiocarbamic acid, while excluding atmospheric oxygen, the reaction mixture containing water in an amount from about 4% to about 22% by weight, the reaction taking place at a temperature below about 110° C.

3. A process as claimed in claim 1 wherein the temperature is from 20° C. to 110° C.

4. A process as claimed in claim 1 wherein the initial reaction mixture contains the water soluble heavy metal salt in an excess of from 5 to 10% by weight over the stoichiometric amount.

5. A process as claimed in claim 1 wherein about 10% by weight of calcium silicate is added to the reaction mixture.

6. A process for the manufacture of manganous dimethyldithiocarbamate, said process comprising reacting manganous sulfate with sodium dimethyldithiocarbamate, while excluding atmospheric oxygen, the reaction mixture containing water in an amount equal to about 15% by weight of the reaction mixture, the reaction taking place at a temperature below about 110° C.

References Cited in the file of this patent

UNITED STATES PATENTS

| | | |
|---|---|---|
| 2,492,314 | Olin et al. | Dec. 27, 1949 |
| 2,693,485 | Gobeil | Nov. 2, 1954 |
| 2,765,327 | Bradley | Oct. 2, 1956 |